R. N. HERRING.
Rubbers for Wash-Boards.
No. 155,304.
Patented Sept. 22, 1874.
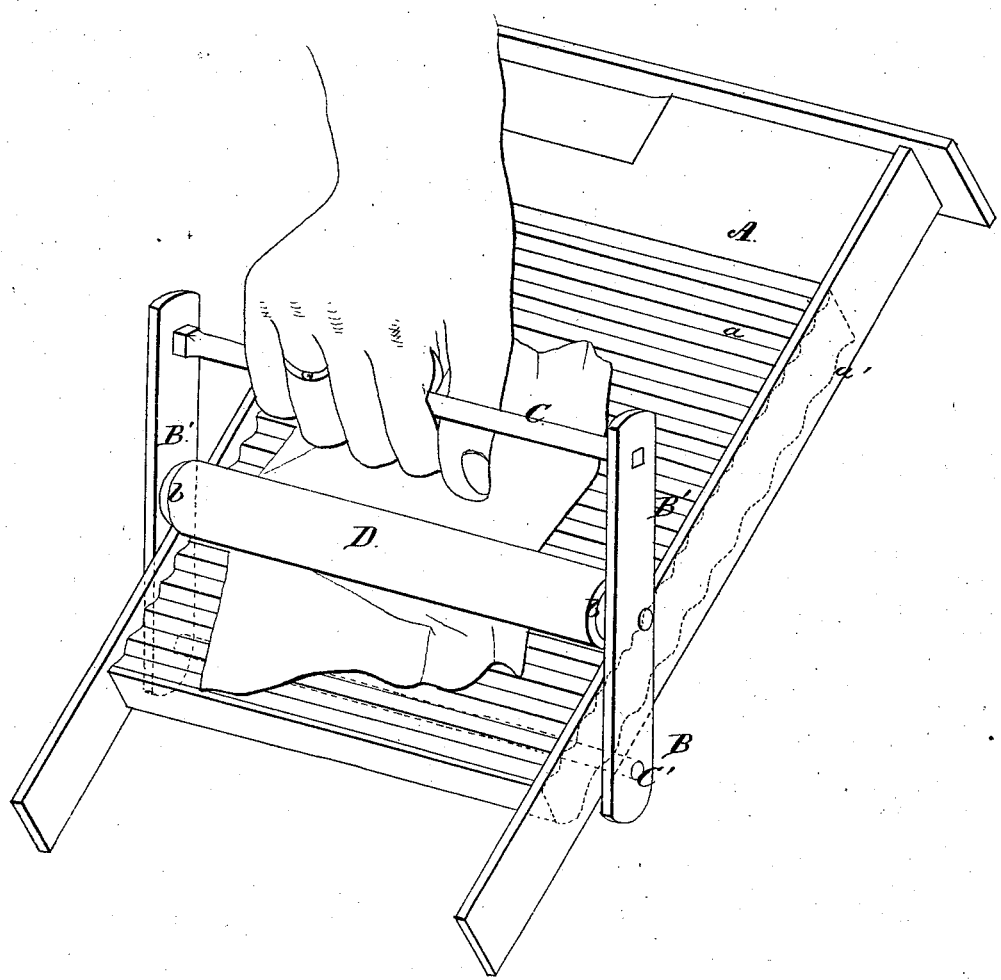

UNITED STATES PATENT OFFICE.

RICHARD N. HERRING, OF CHEW'S LANDING, NEW JERSEY.

IMPROVEMENT IN RUBBERS FOR WASH-BOARDS.

Specification forming part of Letters Patent No. 155,304, dated September 22, 1874; application filed July 11, 1874.

*To all whom it may concern:*

Be it known that I, RICHARD N. HERRING, of Chew's Landing, in the county of Camden and State of New Jersey, have invented certain new and useful Improvements in Wash-Boards; and I do hereby declare the following to be a full, clear, and exact description of the invention, such as will enable others skilled in the art to which it pertains to make and use it, reference being had to the accompanying drawings, which form part of this specification, in which is shown a perspective view of my invention.

This invention has relation to wash-boards; and consists in the novel construction of a detachable and reversible reciprocating rubber, as hereinafter described and claimed.

In the drawings, A designates a wash-board having ridges or corrugations $a$ $a'$ on both sides, being the kind best adapted to the reversibility of the rubber, which may be applied to either side, at pleasure. B designates the rubber, composed of the side pieces B' B', connecting-bars C C', of which the latter serves the purpose of an anti-friction roller, and transverse roller D. The roller D may be plain or ridged on its surface, and is tenoned at $b$ $b$, so that, while it travels on the sides of the board, its frictional or rubbing surface shall be in close contact with the articles to be washed.

When the rubber is applied to the board, the latter passes between the rollers D C', which move in contact with the upper and lower edges, respectively, of the board, the frame of the rubber being inclined backward from the surface of the board.

The bar C serves, as shown, the purpose of a handle for operating the rubber.

I claim—

The detachable rubber B, comprising the sides B' B', transverse bars C C', and rotary cylinder or roller D, substantially as shown and described.

In testimony that I claim the foregoing I have hereunto set my hand this 1st day of July, 1874.

RICHARD N. HERRING.

Witnesses:
 JNO. A. BELL,
 M. DANL. CONNOLLY.